(12) United States Patent
Glück

(10) Patent No.: US 6,414,041 B1
(45) Date of Patent: Jul. 2, 2002

(54) EXPANDABLE STYRENE POLYMERS CONTAINING GRAPHITE PARTICLES

(75) Inventor: Guiscard Glück, Mainz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/830,575

(22) PCT Filed: Nov. 5, 1999

(86) PCT No.: PCT/EP99/08465

§ 371 (c)(1),
(2), (4) Date: May 8, 2001

(87) PCT Pub. No.: WO00/29471

PCT Pub. Date: May 25, 2000

(30) Foreign Application Priority Data

Nov. 16, 1998 (DE) .......................... 198 52 678

(51) Int. Cl.⁷ ................ C08J 9/18; C08J 9/20
(52) U.S. Cl. ............... 521/56; 521/60; 521/99
(58) Field of Search ............... 521/56, 60, 99

(56) References Cited

U.S. PATENT DOCUMENTS

| 5,783,612 A | * | 7/1998 | Batsscheider et al. | ........ 521/56 |
| 5,908,872 A | * | 6/1999 | Gluck et al. | ................ 521/56 |
| 6,130,265 A | * | 10/2000 | Gluck et al. | ................ 521/56 |
| 6,046,245 A1 | * | 4/2001 | Gluck et al. | ................ 52/56 |
| 6,262,193 B1 | * | 7/2001 | Poppelaars et al. | ........ 521/56 |

FOREIGN PATENT DOCUMENTS

| DE | 296 16 364 | 11/1996 |
| EP | 0 863 175 | 9/1998 |
| GB | 1 006 926 | 10/1965 |

* cited by examiner

Primary Examiner—Morton Foelak
(74) Attorney, Agent, or Firm—Oblon, Spivak, McClelland, Maier & Neustadt, P.C.

(57) ABSTRACT

The invention relates to expandable polystyrene beads which comprise graphite particles with an average particle size of more than 50 μm, and also to a process for their preparation by free-radical polymerization of styrene in aqueous suspension. The graphite particles, suspended in styrene, are added to the polymerization mixture at a conversion of from 10 to 100%.

12 Claims, No Drawings

EXPANDABLE STYRENE POLYMERS CONTAINING GRAPHITE PARTICLES

The invention relates to expandable polystyrene beads comprising graphite particles, and to their preparation, and also to foams produced therefrom.

Molded polystyrene foams have been known for a long time and have proven successful in many applications. Foams of this type are produced by foaming blowing-agent-impregnated polystyrene beads, followed by fusion of the resultant foam beads to give moldings. A significant application sector is heat insulation in the construction industry.

The sheets of foam made from molded polystyrene foam and used for heat insulation mostly have densities of at least 30 g/l, since these are the densities at which the thermal conductivity of the molded polystyrene foam is at a minimum. To save on material it is desirable to use sheets of foam having lower densities, in particular $\leq 15$ g/l, for heat insulation. Foams of this type are easy to produce industrially, but sheets made from such foams having a lower density have thermal conductivity values which are markedly poorer, and they do not therefore meet the requirements of thermal conductivity class 035 (DIN 18 164, Part 1).

Patent Applications PCT/EP 97/02457 and PCT/EP 97/02458 propose the incorporation of graphite particles into expandable polystyrene beads as a means of reducing the thermal conductivity of foams prepared therefrom. The graphite particles used have a particle size of preferably from 1 to 50 μm. It has hitherto been impossible to use larger graphite particles in the preferred preparation by suspension polymerization in the presence of the graphite, since the polymerization mixture always coagulated.

It has now been found that free-radical polymerization of styrene in aqueous suspension in the presence of graphite with a particle size of more than 50 μm becomes possible if the graphite particles, preferably suspended in styrene, are added to the polymerization mixture at a conversion of from 10 to 100%.

Surprisingly, it has been found that foams made from expandable polystyrenes which comprise graphite with a particle size of more than 50 μm have higher sound absorption and lower shrinkage than foams made from expandable polystyrenes with graphite of particle size less than 50 μm.

The invention therefore provides expandable polystyrene beads which comprise from 0.1 to 25% by weight, preferably from 1 to 10% by weight, of graphite particles with an average particle size of more than 50 μm. The average particle size is given by Fraunhofer diffraction analysis. For the purposes of the invention the particle size is the longest diameter of the particles. The average particle size should preferably be from 55 to 200 μm, in particular from 60 to 150 μm.

The invention further provides a process for preparing expandable polystyrene beads by polymerization of styrene, if desired together with up to 20% of its weight of comonomers, in aqueous suspension in the presence of graphite and with addition of blowing agents prior to, during or after the polymerization, where the graphite particles used have an average particle size of more than 50 μm and are added to the polymerization mixture at a monomer conversion of from 10 to 100%.

For the purposes of the invention, expandable polystyrenes are polystyrenes comprising blowing agents.

The novel expandable polystyrenes comprise, as polymer matrix, in particular homopolystyrene or styrene copolymers with up to 20% by weight, based on the weight of the polymers, of ethylenically unsaturated comonomers, in particular alkylstyrenes, divinylbenzene, acrylonitrile or α-methylstyrene.

The novel suspension polymerization may use the usual auxiliaries, such as peroxide initiators, suspension stabilizers, blowing agents, chain transfer agents, expansion aids, nucleating agents and plasticizers. Particular preference is given to the addition of flame retardants, preferably in amounts of from 0.1 to 6% by weight, and of flame-retardancy synergists in amounts of from 0.1 to 1% by weight, based in each case on the resultant polystyrene. Preferred flame retardants are aliphatic, cycloaliphatic and aromatic bromine compounds, such as hexabromocyclododecane, pentabromomonochlorocyclohexane and pentabromophenyl allyl ether. Suitable synergists are C-C- or O-O-labile organic compounds, such as dicumyl and dicumyl peroxide. Blowing agents are used in amounts of from 3 to 10% by weight, based on polystyrene. They may be added prior to, during or after the polymerization. Suitable blowing agents are aliphatic hydrocarbons having from 4 to 6 carbon atoms. It is advantageous to use inorganic Pickering dispersing agents, such as magnesium pyrophosphate or calcium phosphate, as suspension stabilizers.

The graphite particles added during the course of the suspension polymerization are usefully suspended in advance in an organic solvent, preferably in styrene. A particularly useful suspension medium is a solution of polystyrene in styrene. It is also possible for graphite to be fed in as a polystyrene master batch. The weight ratio of graphite to suspension medium here is preferably from 80:20 to 20:80, in particular about 50:50.

According to the invention, the graphite suspension is added to the polymerization mixture at a monomer conversion of from 10 to 100%, preferably from 20 to 90% and in particular from 25 to 75%. If the graphite particles are not added until a relatively late stage, the result is polystyrene beads which have a polystyrene shell comprising graphite. Expandable polystyrene beads of this type have good antistatic properties, i.e. good free-flowing properties.

In principle, the novel expandable polystyrene beads may also be prepared by incorporating the graphite particles into a melt of polystyrene and blowing agent in an extruder and pelletizing the extrudate.

The expandable polystyrenes comprising graphite particles may be processed to give molded polystyrene foams with densities of preferably from 5 to 80 g/l, in particular from 10 to 30 g/l.

For this, the expandable beads are prefoamed. This is mostly done by heating the beads with steam in what are known as prefoamers.

The beads prefoamed in this way are then fused to give moldings. For this, the prefoamed beads are introduced into non-gas-tight molds. Steam is then applied. The moldings can be removed after cooling.

The invention further provides moldable polystyrene foams which comprise from 0.1 to 25% by weight of graphite particles with an average particle size of more than 50 μm.

Foams of this type have not only excellent heat insulation properties but also good sound-insulation properties and low shrinkage. The last-named property is important when relatively large moldings are being produced, e.g. for foam slabs which frequently tend to form depressions after removal from the molding machine and even after some days of storage exhibit shrinkage. This is unacceptable in most applications because dimensional stability is required.

EXAMPLE 61.0 g of dicumyl peroxide, 40.0 g of dicumyl, 15 g of hexabromocyclododecane and 20.2 g of dibenzoyl peroxide are dissolved in 18.4 kg of styrene. The organic phase is introduced into 20.0 l of deionized water in a 50 l mixing vessel. The aqueous phase comprises 35.0 g of sodium pyrophosphate and 70.0 g of magnesium sulfate (Epsom salts). The suspension is heated to 80° C. After 110 minutes, at a styrene conversion of about 30%, 1000 ml of styrene comprising 650 g of suspended graphite with an average particle size of 75 $\mu$m (KP 99,5; Graphitwerk Kropfmühl) are metered in. After a further 30 minutes, 1.8 g of emulsifier K 30 (Bayer AG) are added. After a further 30 minutes, 1.60 kg of pentane is metered in and the polymerization is completed at 125° C. The resultant polystyrene beads comprising blowing agent are isolated by decanting, washed and dried. They are foamed by a conventional process to give foam beads which are sintered to give a foam slab of density 10 g/l.

This exhibits only negligible shrinkage, and sheets of foam produced therefrom have good sound-absorption properties.

What is claimed is:

1. A process for preparing expandable polystyrene beads by free-radical polymerization of styrene, optionally together with up to 20% of its weight of comonomers, in aqueous suspension in the presence of graphite and with addition of blowing agents prior to, during or after the polymerization, which comprises adding graphite particles with an average particle size of more than 50 $\mu$m to the polymerization mixture at a monomer conversion of from 10 to 100%.

2. A process as claimed in claim 1, wherein the graphite particles are added at a conversion of from 20 to 90%.

3. A process as claimed in claim 1, wherein the graphite particles have been suspended in styrene before they are added to the polymerization mixture.

4. A process as claimed in claim 1, wherein the polymerization is carried out in the presence of from 0.1 to 25% by weight of graphite, based on the monomers.

5. A process as claimed in claim 1, wherein the graphite particles used have an average particle size of from 55 to 200 $\mu$m.

6. The process of claim 1, wherein said graphite particles have an average particle size of from 60 to 150 $\mu$m.

7. The process of claim 1, wherein said graphite particles have an average particle size of from 75 to 150 $\mu$m.

8. The process of claim 1, wherein said comonomers are selected from the group consisting of alkylstyrene, divinylbenzene, acrylonitrile, $\alpha$-methylstyrene and a mixture thereof.

9. The process of claim 1, wherein said graphite particles are added at a conversion of from 25 to 75%.

10. The process of claim 1, wherein said graphite particles are added as a suspension in an organic solvent.

11. The process of claim 10, wherein said organic solvent is styrene.

12. A method of producing foams comprising:

i) preparing expandable polystyrene beads by free-radical polymerization of styrene, if desired together with up to 20% of its weight of comonomers, in aqueous suspension in the presence of graphite and with addition of blowing agents prior to, during or after the polymerization, which comprises adding graphite particles with an average particle size of more than 50 $\mu$m to the polymerization mixture at a monomer conversion of from 10 to 100%; and ii) prefoaming said expandable beads with steam in prefoamers and fusing said prefoamed beads in non-gas-tight molds to form moldings.

* * * * *